United States Patent
Oh et al.

(10) Patent No.: US 11,845,662 B2
(45) Date of Patent: Dec. 19, 2023

(54) METHOD FOR PREPARING CARBON NANOTUBE FIBER HAVING ENHANCED TENSILE STRENGTH

(71) Applicant: LG CHEM, LTD., Seoul (KR)

(72) Inventors: Eugene Oh, Daejeon (KR); Youngjin Yi, Daejeon (KR); Juhan Kim, Daejeon (KR); Ji Eun Kim, Daejeon (KR); Jun Won Choi, Daejeon (KR); Won Jae Lee, Daejeon (KR); Ye Hoon Im, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1240 days.

(21) Appl. No.: 16/464,488

(22) PCT Filed: Sep. 4, 2018

(86) PCT No.: PCT/KR2018/010239
§ 371 (c)(1),
(2) Date: May 28, 2019

(87) PCT Pub. No.: WO2019/054682
PCT Pub. Date: Mar. 21, 2019

(65) Prior Publication Data
US 2023/0183070 A1    Jun. 15, 2023

(30) Foreign Application Priority Data

Sep. 18, 2017 (KR) .................. 10-2017-0119491

(51) Int. Cl.
*C01B 32/164*    (2017.01)
*C01B 32/162*    (2017.01)
*D01F 9/127*    (2006.01)

(52) U.S. Cl.
CPC .......... *C01B 32/164* (2017.08); *C01B 32/162* (2017.08); *D01F 9/1272* (2013.01); *C01P 2004/51* (2013.01); *D10B 2401/063* (2013.01)

(58) Field of Classification Search
CPC ... C01B 32/162; C01B 32/164; D01F 9/1272; C01P 2004/51; D10B 2401/063
See application file for complete search history.

(56) References Cited

U.S. PATENT DOCUMENTS 9,475,722 B2    10/2016    Enomoto et al.
9,556,542 B2    1/2017    Oh et al.
(Continued)

FOREIGN PATENT DOCUMENTS

AU    2003241175 A1    12/2003
CA    2 856 046 A1    6/2013
(Continued)

OTHER PUBLICATIONS

M. M. Yovanovich et al., "Combined Natural and Forced Convection Heat Transfer from Isothermal Spheres", AIAA Thermophysics, Plasmadynamics and Lasers Conference, Jun. 27-29, 1988.
(Continued)

*Primary Examiner* — Richard M Rump
(74) *Attorney, Agent, or Firm* — BRYAN CAVE LEIGHTON PAISNER LLP

(57) ABSTRACT

The present invention relates to a method for preparing a carbon nanotube fiber which is a continuous array of carbon nanotube. The present invention enables minimization of rotational flow inside a tube reactor and thus can facilitate enhanced tensile strength of the prepared carbon nanotube fiber.

11 Claims, 2 Drawing Sheets

(56) References Cited

U.S. PATENT DOCUMENTS

| | | |
|---|---|---|
| 2004/0253374 A1 | 12/2004 | Jung et al. |
| 2006/0093545 A1 | 5/2006 | Maruyama et al. |
| 2013/0039838 A1 | 2/2013 | Lashmore et al. |
| 2014/0226948 A1 | 8/2014 | Enomoto et al. |
| 2015/0183642 A1 | 7/2015 | Lashmore et al. |
| 2017/0292208 A1 | 10/2017 | Yoon et al. |

FOREIGN PATENT DOCUMENTS

| | | |
|---|---|---|
| CN | 1643193 A | 7/2005 |
| CN | 101665997 A | 3/2010 |
| CN | 103958403 A | 7/2014 |
| CN | 104641028 A | 5/2015 |
| CN | 106957051 A | 7/2017 |
| CN | 107002306 A | 8/2017 |
| CN | 107075744 A | 8/2017 |
| EP | 2 785 636 A2 | 6/2013 |
| EP | 2736844 A1 | 6/2014 |
| EP | 2 803 643 A1 | 11/2014 |
| EP | 3 214 212 A1 | 9/2017 |
| EP | 3214212 A1 | 9/2017 |
| EP | 2 803 643 B1 | 4/2018 |
| JP | 2004-044064 A | 2/2004 |
| JP | 2004-353157 A | 12/2004 |
| JP | 2005-001980 A | 1/2005 |
| JP | 2007-246309 A | 9/2007 |
| JP | 2014-521584 A | 8/2014 |
| JP | 2015-533760 A | 11/2015 |
| KR | 10-2012-0090383 A | 8/2012 |
| KR | 10-2014-0121397 A | 10/2014 |
| KR | 10-2014-0147004 A | 12/2014 |
| KR | 10-1560483 B1 | 10/2015 |
| KR | 10-1614878 B1 | 4/2016 |
| KR | 10-2016-0146256 A | 12/2016 |
| KR | 10-1716584 B1 | 3/2017 |
| WO | 2003/097909 A2 | 11/2003 |
| WO | 2013-066445 A1 | 5/2013 |
| WO | 2013/081499 A2 | 6/2013 |
| WO | 2013/105579 A1 | 7/2013 |

OTHER PUBLICATIONS

Banghua Peng et al., "Effect of the Reynolds and Richardson Numbers on the Growth of Well-Aligned Ultralong 2 Single-Walled Carbon Naotubes", J. Phys. Chem. C 2010, vol. 114, No. 30, pp. 12960-12965.

[Fig. 1]
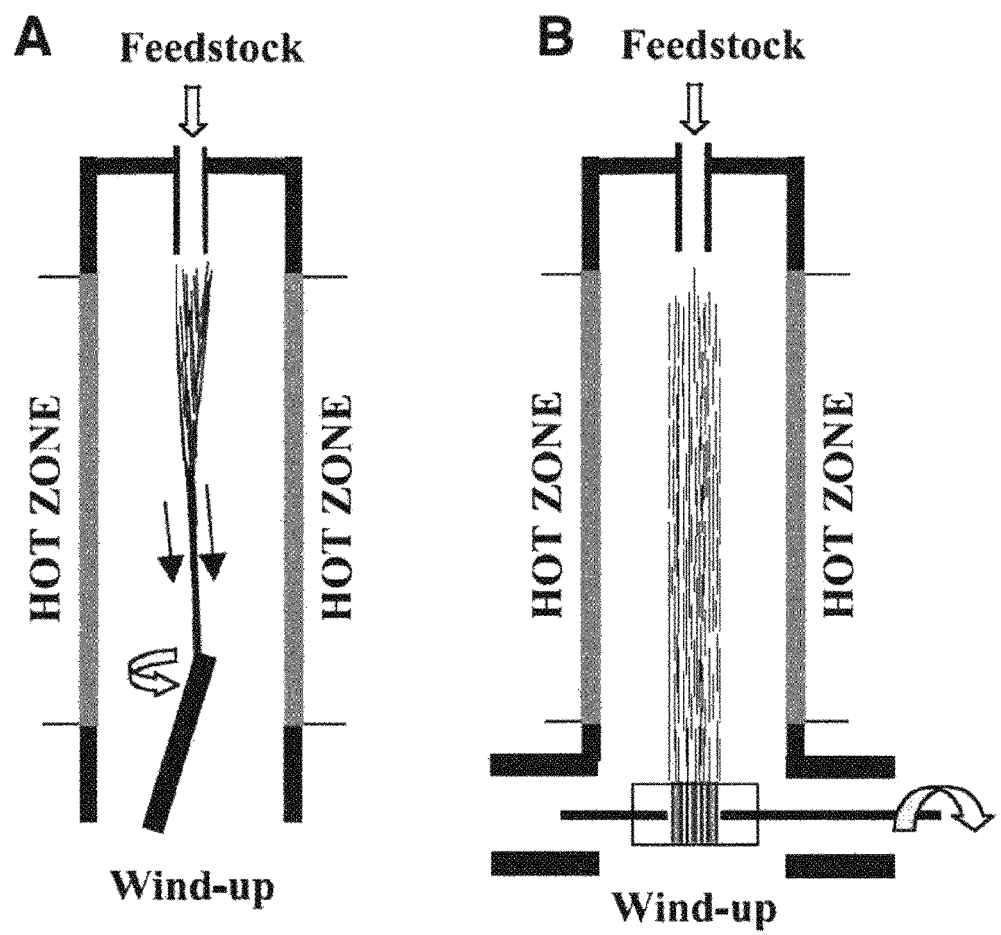

[Fig. 2]
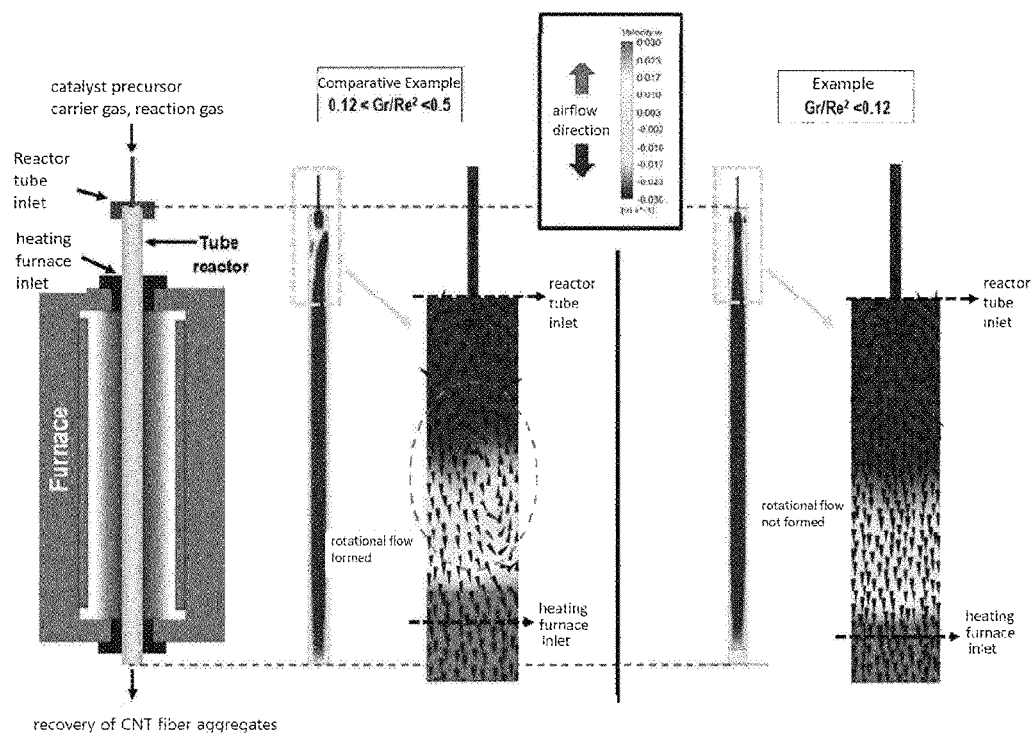

METHOD FOR PREPARING CARBON NANOTUBE FIBER HAVING ENHANCED TENSILE STRENGTH

The present application is a National Phase entry pursuant to 35 U.S.C. § 371 of International Application No. PCT/KR2018/010239 filed on Sep. 4, 2018, and claims priority to and the benefit of Korean Patent Application No. 10-2017-0119491, filed on Sep. 18, 2017, the entire disclosures of which are incorporated herein by reference in their entirety.

FIELD

The present invention relates to a method for manufacturing a carbon nanotube fibrous aggregate, and more particularly to a method for manufacturing carbon nanotube fibers capable of improving tensile strength of carbon nanotube fibers composed of a continuous aggregate of carbon nanotubes capable of improving tensile strength.

BACKGROUND

Carbon nanotube (CNT), which is a kind of carbon allotrope, has a diameter of several to several tens of nanometers and a length of several hundreds of micrometers to several millimeters. CNT has been studied in a variety of fields owing to its excellent thermal, electrical and physical properties and high aspect ratio. The inherent characteristics of such carbon nanotubes are attributed to the $sp^2$ bond of carbon. The carbon nanotubes are stronger than iron and lighter than aluminum, and exhibit electrical conductivity similar to that of metals. Carbon nanotubes can be classified into a single-wall carbon nanotube (SWNT), a double-wall carbon nanotube (DWNT) and a multi-wall carbon nanotube (MWNT) according to the number of walls of the nanotube, and can be classified into zigzag, armchair, and chiral structures according to their asymmetry/chirality.

Most studies to date have focused on dispersion of powdered carbon nanotubes as a reinforcing agent for composites, or the production of transparent conductive films using the dispersion solutions, and have already been commercialized in some fields. In order to use carbon nanotubes in composite materials and transparent conductive films, dispersion of carbon nanotubes is important. However, it is difficult to disperse CNT at a high concentration and to maintain dispersibility because of cohesive force caused by strong van der Waals force of carbon nanotubes. In addition, in the case of a composite material in which carbon nanotubes are used as a reinforcing material, it is difficult to sufficiently manifest the excellent properties of carbon nanotubes.

Recently, research on carbon nanotube fibrillation have been carried out to fabricate carbon nanotube structures that fully manifest the properties of carbon nanotubes.

Examples of methods for fiberizing carbon nanotubes using a dispersion solution containing carbon nanotubes and a dispersant typically include coagulation spinning, liquid-crystalline spinning, array spinning, and direct spinning.

Coagulation spinning is a method for fiberizing carbon nanotubes in which a dispersing solution containing carbon nanotubes and a dispersant is fed into a polymer solution, so that the dispersant in the dispersing solution is transferred into the polymer solution and the polymers are substituted therefor to serve as a binder.

Liquid-crystalline spinning is a method for fiberizing carbon nanotubes using the nature of a carbon nanotube solution to form liquid crystals under specific conditions. This method is advantageous in that it enables to produce carbon nanotube fibers with good orientation, but has a disadvantage that the spinning speed is very slow and the conditions of forming liquid crystals of carbon nanotubes are strict.

Array spinning is a method for fiberizing carbon nanotubes by forming carbon nanotube film from an array of carbon nanotubes vertically aligned on a substrate and then twisting it. This method has an advantage of enabling the formation of carbon nanotube fibers with almost no impurities, but it has a disadvantage in that continuous processing is impossible.

Direct spinning is a method of feeding a liquid carbon source and a catalyst together with a carrier gas into an inlet of a high temperature heating furnace to synthesize carbon nanotubes in the heating furnace, and winding up carbon nanotube aggregates inside (FIG. 1 (A)) or outside (FIG. 1 (B)) the heating furnace to obtain fibers. This method is advantageous in that a larger amount of carbon nanotube fibers can be produced at a spinning speed of up to to 30 m/min, compared with other methods. However, due to the nature of fibrous particles, the carbon nanotube fiber particles may be twisted or agglomerated again and easily adhered to the wall surface of the heating furnace. Therefore, it is very difficult to smoothly discharge the carbon nanotube fibers.

Although the mechanical strength of carbon nanotubes (CNTs) themselves is very high, especially tensile strength exceeds 100 GPa, synthesized CNTs are limited in application because they are short fibers having a short length. In order to solve this problem, a method of manufacturing CNT aggregate, that is, long CNT fibers by connecting short CNT fibers has been recently studied.

Variables affecting strength of the fiber which is an aggregate of CNTs, include length, diameter, and bonding strength between CNTs. In order to improve tensile strength of the CNT aggregate, the bonding force between the CNTs constituting CNT fibers should be increased and the length of the CNTs should be increased [Gary G. Tibbetts, Carbon 30, 399, (1992)].

However, in the vertical type reactor as shown in FIG. 1, the flow of the air stream is formed from the upper part to the lower part of the reactor. Thereby, the gas to be fed into the reactor at a high temperature is affected by the buoyancy. There is a problem that a stable gas flow is not formed but a rotational flow is generated [Ya-Li Li et al. Science 304, 276 (2004)]. The rotational flow promotes growth of catalyst particles within the reactor and makes it difficult to form long CNTs. In a horizontal reactor, a similar rotational flow is formed, and this problem may occur therein as well.

Therefore, in order to improve tensile strength of CNT aggregate fibers, it is necessary to eliminate or suppress the rotational flow formed inside the reactor.

SUMMARY

It is an object of the present invention to provide a method for manufacturing carbon nanotube fibers capable of effectively improving tensile strength of CNT fiber that is a continuous aggregate of CNT.

In order to solve the above problems, the present invention provides a method for manufacturing carbon nanotube fiber that is a continuous aggregate of carbon nanotubes, by feeding a reaction gas containing a carbon source into a reactor tube equipped with a heating furnace together with a catalyst or a catalyst precursor and a transfer gas, wherein a Gr/Re$^2$ value calculated from the Grashof number Gr and the Reynolds number Re in the area between the inlet of the reactor tube and the inlet of the heating furnace is 0.12 or less, thereby suppressing a rotational flow.

According to one aspect, the temperature gradient between the inlet of the reactor tube and the inlet of the heating furnace may be adjusted so that the Grashof number Gr and the Reynolds number Re satisfy $0.007 \leq Gr/Re^2 \leq 0.12$. At this time, the temperature difference between the inlet of the reactor tube and the inlet of the heating furnace may be 510 to 1000° C. or 560 to 700° C.

According to an aspect, the reactor tube may be a vertical type reactor tube in which the reaction gas, the catalyst or the catalyst precursor and the transfer gas are fed into the top of the reactor tube, and the produced carbon nanotubes are discharged from the bottom of the reactor tube to form a continuous aggregate.

In addition, the reaction zone of the reactor tube may be heated to 1,000 to 3,000° C. or 1,150 to 1,300° C.

According to one aspect, the transfer gas may be a reducing gas comprising hydrogen gas, ammonia gas, or a mixed gas thereof.

Furthermore, the transfer gas may further comprise an inert gas.

The carbon source may comprise at least one selected from the group consisting of methane, ethylene, acetylene, methyl acetylene, vinyl acetylene, ethanol, methanol, propanol, acetone, xylene, chloroform, ethyl acetate, diethyl ether, polyethylene glycol, ethyl formate, mesitylene, tetrahydrofuran (THF), dimethylformamide (DMF), dichloromethane, hexane, benzene, carbon tetrachloride and pentane.

The catalyst or the catalyst precursor may comprise at least one selected from the group consisting of iron, nickel, cobalt, platinum, ruthenium, molybdenum, vanadium and oxides thereof.

According to one embodiment, a catalytic activator selected from elemental sulfur, a sulfur-containing compound, and combinations thereof may be further fed, together with the catalyst or the catalyst precursor.

The catalytic activator may comprise a compound selected from methylthiol, methyl ethyl sulfide, dimethylthioketone, phenylthiol, diphenylsulfide, pyridine, quinoline, benzothiophene, thiophene, and combinations thereof.

Preferably, the catalyst or catalyst precursor may be in a metallocene form.

The Gas Hourly Space Velocity (GHSV) of the reaction gas may be 0.12 to 6.0 hr$^{-1}$, and the GHSV of the transfer gas may be 1.2 to 300 hr$^{-1}$. The Gas Hourly Space Velocity (GHSV), which is a value measured at a standard state (0° C., 1 bar), refers to a ratio of the volumetric flow rate of the gas to be supplied to the volume of the reactor, wherein the unit time is given as an hour.

According to another embodiment of the present invention, there is provided a carbon nanotube fiber produced by the above method.

According to a method for producing a carbon nanotube fiber aggregate according to the present invention, the rotational flow formed in the reactor is minimized to allow a stable gas flow, thereby improving tensile strength of the resulting CNT fibrous aggregate. Accordingly, the carbon nanotube fiber aggregate produced by a method according to the present invention is expected to be applied to a wide variety of fields such as as a reinforcing material for a multifunctional composite material, a deformation and damage sensor using a stable repetitive piezoresistive effect, a transmission line using high conductivity, electrochemical devices using high specific surface area, excellent mechanical properties and electrical conductivity, for example microelectrode materials for sensing biomaterials, supercapacitors, and actuators.

Other specific embodiments of the present invention are included in the following detailed description.

BRIEF DESCRIPTION OF THE DRAWINGS

FIG. 1 schematically shows a method for producing carbon nanotube fibers by direct spinning.

FIG. 2 shows a schematic structure of a reactor for producing CNT aggregate fiber according to one embodiment of the present invention, and a CFD (computational fluid dynamics) simulation result for an airflow direction according to a Comparative Example and an Example.

DETAILED DESCRIPTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

The term "aggregate" as used herein may be described interchangeably with "agglomerate" and may be understood to mean a collection of singular individuals.

The term "feeding" as used herein may be described interchangeably with "inflow", "injection", and may be understood to mean flowing or putting liquid, gas or heat, etc. into the places in a need thereof.

The term "carbon nanotube fiber" in the present disclosure refers to both of carbon nanotubes grown in a fiber form and a plurality of carbon nanotubes fused in a fiber form.

Hereinafter, a method for producing carbon nanotube fibers according to an embodiment of the present invention will be described in detail.

A method for producing carbon nanotube fibers include coagulation spinning, liquid-crystalline spinning, array spinning, direct spinning, and the like. Among them, the present invention follows a process of directly spinning carbon nanotube fibers.

Direct spinning is a method of feeding a liquid carbon source and a catalyst together with a carrier gas into an inlet of a high-temperature heating furnace to synthesize carbon nanotubes, and winding up carbon nanotube aggregates discharged from an outlet of the heating furnace together with the carrier gas inside or outside the heating furnace to obtain fibers.

The present invention provides a method for manufacturing carbon nanotube fiber that is a continuous aggregate of carbon nanotubes by feeding a reaction gas containing a carbon source into a reactor tube together with a catalyst or a catalyst precursor and a transfer gas, wherein a Gr/Re$^2$ value calculated from the Grashof number Gr and the Reynolds number Re in the reactor tube is 0.12 or less, or satisfies $0.007 \leq Gr/Re^2 \leq 0.12$, thereby suppressing a rotational flow.

The rotational flow refers to a vortex flow generated by a gas flowing in the direction opposite to the flow of a reaction gas containing a carbon source. As shown in FIG. 2, tensile strength of the resultant carbon nanotube fibers can be improved by suppressing a rotational flow.

Grashof number Gr and Reynolds number Re are as follows:

Reynolds number: $Re=wd/v$

Grashof number: $Gr=(d^3 g\beta\Delta\theta)/(v^2)$ wherein, w is the flow rate of the reaction gas containing the carbon source, v is the kinetic viscosity of the reaction gas containing the carbon source, d is the inner diameter of the reactor tube, g is the gravitational acceleration, $\beta$ is the thermal expansion coefficient of the reaction gas containing the carbon source, $\Delta\theta$ is the average temperature difference between the temperature of the reactor wall and the gas temperature inside the reactor.

According to the research by the present inventors, it was found that the rotational flow in the reactor tube was suppressed and tensile strength of the resultant CNT fiber was improved by 2 to 3 times, when the Grashof number Gr and the Reynolds number Re were controlled to $0.007 \leq Gr/Re^2 \leq 0.12$ in the area of the reactor tube inlet, for example, in the area between the top of the reactor tube and the inlet of the furnace of the structure in which the furnace surrounds the reactor tube. According to one embodiment, $Gr/Re^2$ may be 0.01 or more, or 0.02 or more, or 0.05 or more.

In order to ensure that the Grashof number Gr and the Reynolds number Re satisfy the above relationship, the temperature gradient inside the reactor tube, the gas flow rate, and the inside diameter of the reactor tube may be adjusted.

According to one embodiment, the catalyst or the catalyst precursor may be fed at 0.5 to 10 wt %, or 1 to 5 wt %, or 1.5 to 4 wt %, based on the carbon source. When the catalyst or the catalyst precursor is excessively used in comparison with the carbon source, the catalyst acts as an impurity, which makes it difficult to obtain high-purity carbon nanotube fibers. Rather, it may impair thermal, electrical, and physical properties of the carbon nanotube fibers.

The catalyst precursor is a substance that is not itself included in the catalytic cycle but changes to an active catalyst or produces an active catalyst in the system of the catalytic reaction. After the catalyst precursor forms a catalyst, CNT is synthesized.

The catalyst or the catalyst precursor may comprise at least one selected from the group consisting of iron, nickel, cobalt, platinum, ruthenium, molybdenum, vanadium and oxides thereof, but is not limited thereto. The catalyst may be in the form of nanoparticle. Preferably, it may be in a metallocene form such as ferrocene, which is a compound containing iron, nickel, cobalt, etc. According to a preferred embodiment, the ferrocene catalyst precursor can be fed at a rate of 0.05 to 0.2 g/hr or 0.05 to 0.1 g/hr.

In the present invention, the catalytic activator may be fed together with the catalyst or the catalyst precursor. In general, carbon nanotubes are synthesized by diffusion of carbons to the catalyst in a molten state, followed by precipitation of the carbon nanotubes. The catalytic activator increases a diffusion rate of carbon in the synthesis of carbon nanotubes, thereby allowing carbon nanotubes to be synthesized in a short time. In addition, the catalytic activator reduces a melting point of the catalyst and removes amorphous carbons to allow high purity carbon nanotubes to be synthesized at low temperature.

As the catalytic activator, for example, elemental sulfur, a sulfur-containing compound and a combination thereof can be used. Specific examples thereof include sulfur-containing aliphatic compounds such as methylthiol, methylethylsulfide, dimethylthioketone and the like; sulfur-containing aromatic compounds such as phenylthiol, diphenylsulfide and the like; sulfur-containing heterocyclic compounds such as pyridine, quinoline, benzothiophene, thiophene and the like; elemental sulfur, preferably sulfur or thiophene, and more preferably sulfur. According to a preferred embodiment, the catalytic activator may be fed at a rate of 0.01 to 0.3 g/hr, or 0.01 to 0.2 g/hr or 0.01 to 0.1 g/hr.

According to a preferred embodiment of the present invention, the catalyst precursor and the catalytic activator may be in a liquid phase for the liquid carbon compound, and may be in a gas phase for the gaseous carbon compound. Therefore, the catalyst precursor or the catalytic activator can be melted and then fed into the liquid carbon compound, or it can be vaporized and then fed in a gaseous state into the gaseous carbon compound.

In the present invention, the carbon source may be in a liquid or gas phase. The carbon source is diffused to a catalyst and thus synthesized into carbon nanotubes. It is used in consideration of molecular weight distribution, concentration, viscosity, surface tension, dielectric constant and properties of the solvent to be used.

The liquid or gaseous carbon source may comprise at least one selected from the group consisting of methane, ethylene, acetylene, methyl acetylene, vinyl acetylene, ethanol, methanol, propanol, acetone, xylene, chloroform, ethyl acetate, diethyl ether, polyethylene glycol, ethyl formate, mesitylene, tetrahydrofuran (THF), dimethylformamide (DMF), dichloromethane, hexane, benzene, carbon tetrachloride and pentane.

Specifically, the liquid carbon source may comprise at least one selected from the group consisting of ethanol, methanol, propanol, acetone, xylene, chloroform, ethyl acetate, diethyl ether, polyethylene glycol, ethyl formate, mesitylene, tetrahydrofuran (THF) dimethylformamide (DMF), dichloromethane, hexane, benzene, carbon tetrachloride, and pentane. Preferably, it may comprise at least one selected from the group consisting of ethanol ($C_2H_5OH$), xylene ($C_8H_{10}$), diethyl ether [$(C_2H_5)_2O$], polyethylene glycol [$—(CH_2H_2O)_9$], 1-propanol ($CH_3CH_2CH_2OH$), acetone ($CH_3OCH_3$), ethyl formate ($CH_3CH_2COOH$), benzene ($C_6H_6$), hexane ($C_6H_{14}$), and mesitylene [$C_6H_3(CH_3)_3$].

The gaseous carbon source may comprise at least one selected from the group consisting of methane, ethylene, acetylene, methyl acetylene, and vinyl acetylene.

In the present invention, the GHSV of the reaction gas to be supplied into the reaction zone may be 0.12 to 6.0 $hr^{-1}$, preferably 0.6 to 3.6 $hr^{-1}$, more preferably 0.84 to 2 $hr^{-1}$, or 1 to 2 $hr^{-1}$.

In addition, the GHSV of the transfer gas to be fed into the reaction zone, for example in the case of hydrogen gas, can be appropriately selected in the range of 1.2 to 60 $hr^{-1}$, or 6 to 30 $hr^{-1}$, or 12 to 30 $hr^{-1}$.

According to another embodiment, the transfer gas may be fed at a linear velocity of 0.5 to 50 cm/min, preferably 0.5 to 40 cm/min or 0.5 to 30 cm/min, or 0.5 to 20 cm/min or 1 to 10 cm/min. The linear velocity of the transfer gas may vary depending on the kind of the transfer gas, the size of the reactor, the type of the catalyst, and the like.

According to one embodiment, the transfer gas (carrier gas) may comprise an inert gas, a reducing gas, or a combination thereof, preferably a reducing gas containing hydrogen atom. As the reducing gas, a gas containing hydrogen, ammonia, or a combination thereof may be used.

The inert gas may comprise a gas containing nitrogen, helium, neon, argon, krypton, xenon, radon or a mixture thereof. The inert gas is chemically very stable and has a nature of not exchanging or sharing electrons, and therefore it can serve to flow and migrate carbon nanotubes due to the gas inflow without reacting with carbon nanotube (CNT).

According to a preferred embodiment, the carbon nanotube fiber aggregate can be prepared by direct spinning, in which carbon nanotube fibers are directly spun by chemical vapor deposition. Direct spinning is a method of feeding a liquid carbon source and a catalyst together with a carrier gas into an inlet of a high-temperature heating furnace to synthesize carbon nanotubes, and winding up carbon nanotube aggregates discharged from an outlet of the heating furnace together with the carrier gas inside or outside the heating furnace to obtain fibers.

The temperature of the reaction zone may be 1,000 to 3,000° C. Preferably the temperature may be 1,000 to 2,000° C., or 1,000 to 1,500° C., or 1,000 to 1,300° C., and more preferably 1,150 to 1,300° C. If the temperature is less than 1,000° C., there may be a problem that carbon nanotube fibers are not formed. If the temperature exceeds 3,000° C., there may be a problem that carbon nanotubes are vaporized. Therefore, the above range is preferable.

The resulting carbon nanotube fibers may be collected by winding. The winding speed influences that the carbon nanotubes in the fiber are oriented in the fiber axis direction and determines the thermal, electrical and physical properties of the carbon nanotube fibers. Preferably it may be wound at a speed of 1 to 100 m/min Hereinafter, embodiments of the present invention will be described in detail so that those skilled in the art can easily carry out the present invention. The present invention may, however, be embodied in many different forms and should not be construed as limited to the embodiments set forth herein.

EXAMPLES

Example 1: Synthesis of Carbon Nanotube Fiber

Ferrocene catalyst precursor and sulfur catalytic activator were vaporized and fed into a top of a vertical cylindrical reactor at a temperature of 1,170 to 1,250° C. at a rate of 0.06 to 0.08 g/hr and at a rate of 0.01 to 0.03 g/hr, respectively. And methane as a carbon compound and a transfer gas (hydrogen) were inflowed to the top of the reactor at a GHSV of 1 to 2 $hr^{-1}$ and at a GHSV of 25 to 30 $hr^{-1}$, respectively. The reaction was carried out by controlling the temperature gradient in the reactor such that $0.007 \leq Gr/Re^2 \leq 0.12$ in the area between the inlet of the reactor tube and the inlet of the heating furnace. At this time, Gr=0.2 to 2.1 and Re=4.3 to 5.4, and the temperature gradient inside the reactor was adjusted so that the inlet temperature of the reactor tube was 250° C. and the temperature of the inlet of the heating furnace was 816° C. The carbon nanotube fibers discharged from the outlet at the bottom of the reactor were wound by a winding means comprising a bobbin.

Comparative Example 1: Synthesis of Carbon Nanotube Fiber

Carbon nanotube fibers were synthesized by direct spinning in the same manner as in Example 1, except that the temperature gradient at the upper portion of the reactor is adjusted to 250° C. at the inlet of the reactor tube and to 756° C. at the inlet of the heating furnace so that $0.12 < Gr/Re^2$ in the area of the heating furnace inlet.

Specifically, the Reynolds number Re was calculated as follows.

Reynolds number: $Re = W \, d/v$

W (flow rate of a reaction gas containing a carbon source): The gas flow rate is calculated considering the expansion of the gas according to the temperature. The gas flow rate is shown in Table 1 below.

v (kinetic viscosity of a reaction gas containing a carbon source): The viscosity and the density according to the temperature are determined, and the viscosity is divided by the density to obtain a kinetic viscosity. The kinetic viscosity is shown in Table 1 below.

d (inner diameter of reactor tube)=0.065 m

TABLE 1

| | Location divided a distance between reactor tube inlet and heating furnace inlet by 10 | | Viscosity (kg/m · s) | Density (kg/m3) | Kinetic Viscosity (V) | Gas Flow Rate (W, m/s) |
|---|---|---|---|---|---|---|
| Exam. 1 | (Reactor tube inlet) | 1 | 1.25.E−05 | 0.048 | 2.59.E−04 | 0.021 |
| | | 2 | 1.25.E−05 | 0.048 | 2.59.E−04 | 0.022 |
| | | 3 | 1.30.E−05 | 0.045 | 2.87.E−04 | 0.022 |
| | | 4 | 1.35.E−05 | 0.043 | 3.16.E−04 | 0.023 |
| | | 5 | 1.39.E−05 | 0.040 | 3.44.E−04 | 0.026 |
| | | 6 | 1.44.E−05 | 0.038 | 3.74.E−04 | 0.028 |
| | | 7 | 1.51.E−05 | 0.035 | 4.28.E−04 | 0.031 |
| | | 8 | 1.58.E−05 | 0.033 | 4.85.E−04 | 0.034 |
| | | 9 | 1.71.E−05 | 0.029 | 5.93.E−04 | 0.039 |
| | (Heating Furnace inlet) | 10 | 1.82.E−05 | 0.026 | 7.07.E−04 | 0.044 |
| Comp. Exam. 1 | (Reactor tube inlet) | 1 | 1.25.E−05 | 0.048 | 2.59.E−04 | 0.021 |
| | | 2 | 1.30E−05 | 0.045 | 2.87.E−04 | 0.022 |
| | | 3 | 1.33E−05 | 0.043 | 3.07.E−04 | 0.023 |
| | | 4 | 1.37E−05 | 0.042 | 3.28.E−04 | 0.024 |
| | | 5 | 1.41E−05 | 0.040 | 3.52.E−04 | 0.025 |
| | | 6 | 1.44E−05 | 0.038 | 3.77.E−04 | 0.026 |
| | | 7 | 1.51E−05 | 0.035 | 4.28.E−04 | 0.028 |
| | | 8 | 1.58E−05 | 0.033 | 4.81.E−04 | 0.030 |
| | | 9 | 1.75E−05 | 0.028 | 6.37.E−04 | 0.036 |
| | (Heating Furnace inlet) | 10 | 1.91E−05 | 0.024 | 8.06.E−04 | 0.042 |

In addition, the Grashof number Gr was calculated as follows:

$$\text{Grashof number: } Gr = (d^3 g \beta \Delta \theta)/(v^2)$$

wherein, g is the gravitational acceleration,

β is the thermal expansion coefficient of the reaction gas containing the carbon source, d is the inner diameter of the reactor tube (0.065 m), v is the kinetic viscosity (see, Table 1), Δθ=(the surface temperature of the reactor tube)−(the gas temperature inside the reactor).

Fluent CFD software (ver. 16, Ansys) was used to calculate the surface temperature of the reactor tube. The gas temperature inside the reactor was measured by placing a thermometer inside the reactor.

Table 2 shows the temperature and $Gr/Re^2$ according to the distance from the inlet of the reactor tube to the inlet of the heating furnace for Example 1 and Comparative Example 1.

TABLE 2

| | Distance from the inlet of the reactor tube (m) | Temperature (° C.) | Gr | Re | $Gr/Re^2$ |
|---|---|---|---|---|---|
| Example 1 | 0.0 (reactor tube inlet) | 250 | 0.2 | 5.34 | 0.007 |
| | 0.2 (heating furnace inlet) | 816 | 1.97 | 4.05 | 0.12 |
| Comparative Example 1 | 0.0 (reactor tube inlet) | 250 | 0.2 | 5.34 | 0.007 |
| | 0.2 (heating furnace inlet) | 756 | 5.90 | 3.36 | 0.52 |

It was found that in Comparative Example 1, since the temperature of the inlet of the heating furnace was low and a sudden change in temperature occurred, $Gr/Re^2$ was increased, whereas in Example 1, since a relatively slow temperature change occurred around the inlet of the heating furnace, $Gr/Re^2$ was decreased.

FIG. 2 shows CFD simulations about whether a rotational flow is formed or not, for Example 1 and Comparative Example 1. It is found that in the Comparative Example 1, the rotational flow was formed inside the reactor tube, whereas in the Example 1, the rotational flow was not formed and the airflow was stable.

The tensile strength of the carbon nanotube fibers of Example 1 and Comparative Example 1 was measured and the results are shown in Table 3. The tensile strength was measured at a speed of 2 mm/min using FAVIMAT+ instrument of Textechno (load cell range: 210 cN, gauge length: 2.0 cm).

TABLE 3

| | $Gr/Re^2$ | Formation of rotational flow | Relative tensile strength |
|---|---|---|---|
| Example 1 | 0.007 to 0.12 | X | 346.1 |
| Comparative Example 1 | 0.12 or more to 0.52 | ○ | 100 (reference) |

From the above results, it can be seen that the tensile strength is significantly improved by 3 times or more, when the Grashof number Gr and the Reynolds number Re satisfies $0.007 \leq Gr/Re^2 \leq 0.12$ in the area between the inlet of the reactor tube and the inlet of the heating furnace. This is because the rotational flow in the reactor tube is minimized and the airflow is stabilized within the above range.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A method for manufacturing carbon nanotube fiber that is a continuous aggregate of carbon nanotubes, by feeding a reaction gas containing a carbon source into a reactor tube equipped with a heating furnace together with a catalyst or a catalyst precursor and a transfer gas, comprising:

suppressing rotational flow within the reactor by providing a $Gr/Re^2$ value, calculated from Grashof number Gr and Reynolds number Re in an area between an inlet of the reactor tube and an inlet of the heating furnace, of 0.12 or less.

2. The method for manufacturing carbon nanotube fiber according to claim 1, wherein a temperature gradient between the inlet of the reactor tube and the inlet of the heating furnace is adjusted so that the Grashof number Gr and the Reynolds number Re satisfy $0.007 \leq Gr/Re^2 \leq 0.12$.

3. The method for manufacturing carbon nanotube fiber according to claim 1, wherein the reaction zone of the reactor tube is heated to 1,000 to 3,000° C., and a temperature difference between the inlet of the reactor tube and the inlet of the heating furnace is 510 to 1000° C.

4. The method for manufacturing carbon nanotube fiber according to claim 1, wherein the transfer gas comprises a reducing gas comprising hydrogen gas, ammonia gas, or a mixed gas thereof.

5. The method for manufacturing carbon nanotube fiber according to claim 1, wherein the transfer gas further comprises an inert gas.

6. The method for manufacturing carbon nanotube fiber according to claim 1, wherein the carbon source comprises at least one selected from the group consisting of methane, ethylene, acetylene, methyl acetylene, vinyl acetylene, ethanol, methanol, propanol, acetone, xylene, chloroform, ethyl acetate, diethyl ether, polyethylene glycol, ethyl formate, mesitylene, tetrahydrofuran (THF), dimethylformamide (DMF), dichloromethane, hexane, benzene, carbon tetrachloride and pentane.

7. The method for manufacturing carbon nanotube fiber according to claim 1, wherein the catalyst or the catalyst precursor comprises at least one selected from the group consisting of iron, nickel, cobalt, platinum, ruthenium, molybdenum, vanadium and oxides thereof.

8. The method for manufacturing carbon nanotube fiber according to claim 1, wherein a catalytic activator selected from element sulfur, a sulfur-containing compound, and combinations thereof is further fed together with the catalyst or the catalyst precursor.

9. The method for manufacturing carbon nanotube fiber according to claim 8, wherein the catalytic activator comprises one or more of: methylthiol, methyl ethyl sulfide, dimethylthioketone, phenylthiol, diphenylsulfide, pyridine, quinoline, benzothiophene, and thiophene.

10. The method for manufacturing carbon nanotube fiber according to claim 1, wherein the catalyst or the catalyst precursor is in a metallocene form.

11. The method for manufacturing carbon nanotube fiber according to claim 1, wherein a Gas Hourly Space Velocity (GHSV) of the reaction gas is 0.12 to 6 hr$^{-1}$, and the GHSV of a transfer gas is 1.2 to 60 hr$^{-1}$.

\* \* \* \* \*